United States Patent [19]

Oddenino

[11] Patent Number: 4,664,022
[45] Date of Patent: May 12, 1987

[54] PERFECTED AIR INLET

[75] Inventor: Manrico Oddenino, Buttigliera Alta, Italy

[73] Assignee: ITW Fastex Italia S.p.A., Turin, Italy

[21] Appl. No.: 827,594

[22] Filed: Feb. 10, 1986

[30] Foreign Application Priority Data

Apr. 16, 1985 [IT] Italy ............................. 53245/85[U]

[51] Int. Cl.⁴ ........................ B60H 1/34; F24F 13/14
[52] U.S. Cl. ........................................ 98/2; 98/40.26
[58] Field of Search ................. 98/2, 40.24, 40.26, 98/40.27, 94.2, 110, 121.2

[56] References Cited

U.S. PATENT DOCUMENTS

| 2,317,798 | 4/1943 | Otto | 98/40.24 |
| 3,952,639 | 4/1976 | Nobata | 98/2 |
| 4,377,107 | 3/1983 | Izumi | 98/2 X |

FOREIGN PATENT DOCUMENTS

| 3001163 | 7/1981 | Fed. Rep. of Germany | 98/2 |
| 33048 | 2/1983 | Japan | 98/2 |

Primary Examiner—Harold Joyce
Attorney, Agent, or Firm—J. P. O'Brien; T. W. Buckman

[57] ABSTRACT

Air inlet for a vehicle dash-panel of the type whereby the air supply opening is screened off. For directing the air flowing through the said opening, the inlet is provided with a number of deflecting vanes, arranged side by side and designed to divert the air flow parallel with a first plane perpendicular to the said vanes, and a pair of deflecting surfaces designed to divert the air flow parallel with a second plane perpendicular to the said first plane, and supporting the said vanes hinged perpendicularly to respective front edges coplanar with the said opening and adjacent to the said screen.

2 Claims, 4 Drawing Figures

PERFECTED AIR INLET

BACKGROUND OF THE INVENTION

The present invention relates to an air inlet for a vehicle dash-panel, of the type whereby the air supply opening is closed off by a rigid ornamental screen. A known requirement on vehicle air inlets is that they provide for ensuring access to all parts of the passenger compartment by diverting the in-coming air stream in two directions perpendicular to each other. On known types of air inlets, this is achieved by means of a row of deflecting vanes, one direction of which is controlled by a slide mechanism, and the other by turning the entire inlet body. As such a system, however, requires that the inlets project outward of the dash-panel, it cannot be employed on inlets on which the supply opening is screened off, on account of the said screen having to be flush with the dash-panel. Nor is the problem solved by simply setting the inlet body back far enough from the screen for enabling it to be turned, in that, on encountering the said screen, the set direction of the incoming air stream would be impaired.

SUMMARY OF THE INVENTION

The air of the present invention is to provide an air inlet with a screened air supply opening, designed to enable the in-coming air stream to be diverted effectively and easily in two directions perpendicular to each other.

With this aim in view, the present invention relates to an air inlet for a vehicle dash-panel, comprising a number of side walls defining an air supply duct, a screen for closing off the supply opening on the said inlet, a number of movable vanes arranged side by side and designed to divert the air steam flowing through the said opening along a given first path, and means for controlling the said vanes in such a manner as to vary the direction of the said first path in a first plane containing the same; characterised by the fact that it comprises a pair of deflecting surfaces housed inside the said supply duct in the immediate vicinity of the said screen and supporting the said vanes; the said deflecting surfaces being designed to divert the said air stream along a second given path lying in a second plane perpendicular to the said first plane, and having respective front edges essentially coplanar with the said supply opening and on which are hinged perpendicularly the said vanes; the said front edges and respective rear edges of the said deflecting surfaces being hinged to respective guides on the said side walls, and at least one of the said deflecting surfaces being connected to actuating means for sliding the said edges along the said guides; the latter being designed in such a manner as to turn the said deflecting surfaces in opposite directions and at right-angles to the said vanes, so as to vary the direction of the said given second path in the said second plane.

BRIEF DESCRIPTION OF THE DRAWINGS

A non-limiting arrangement of the present invention will now be described with reference to the attached drawings in which.

DETAILED DESCRIPTION OF THE INVENTION

Figure 1:
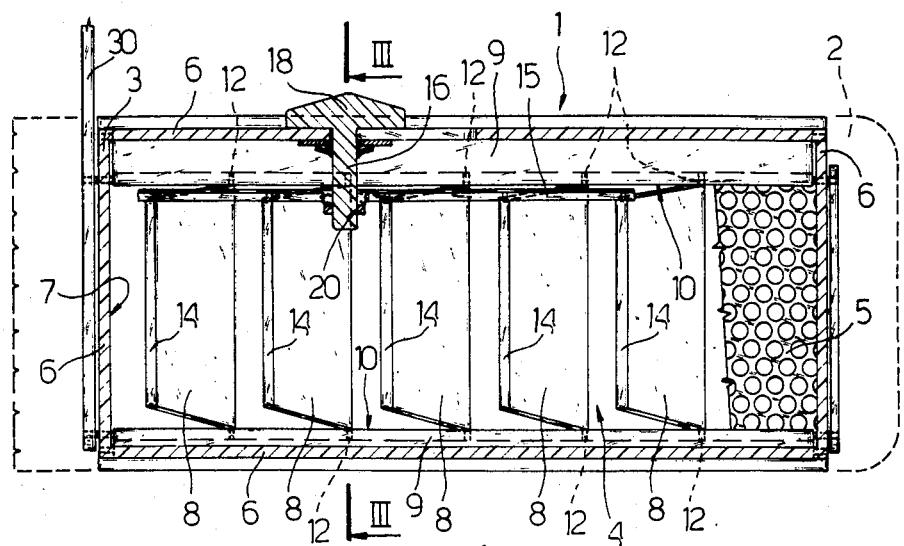
FIG. 1 shows a partially-sectioned rear view of the front of the inlet according to the present invention.
Figure 2:
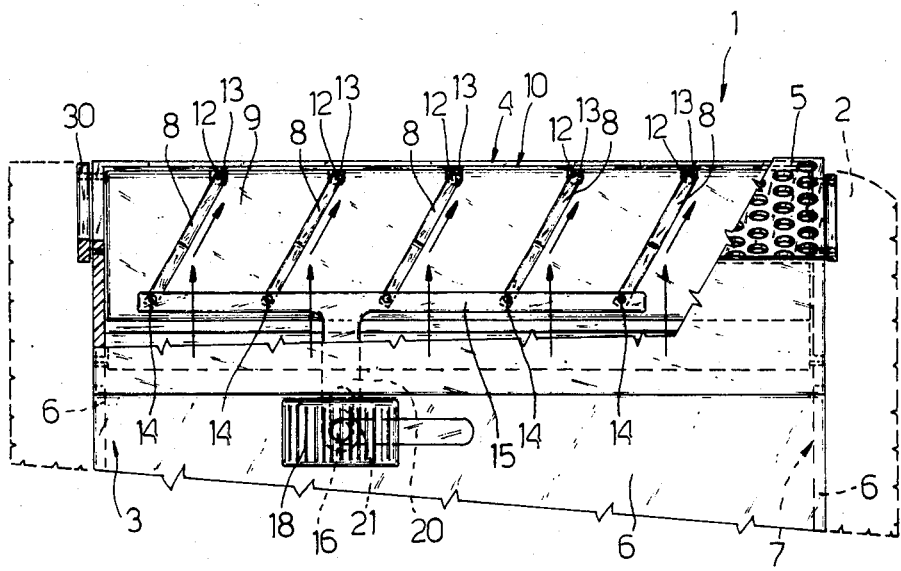
FIG. 2 shows a top plan view of the FIG. 1 inlet.
Figure 3:
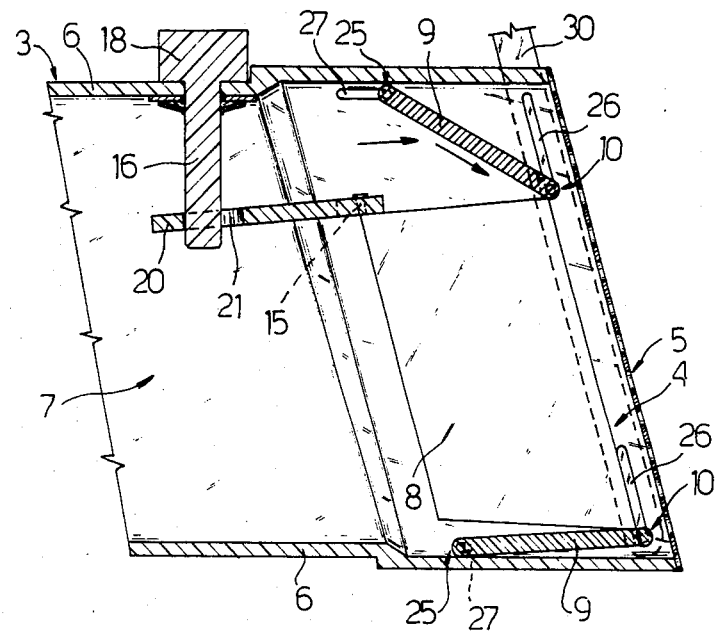
FIG. 3 shows a section along line III—III of the FIG. 1 inlet.
Figure 4:
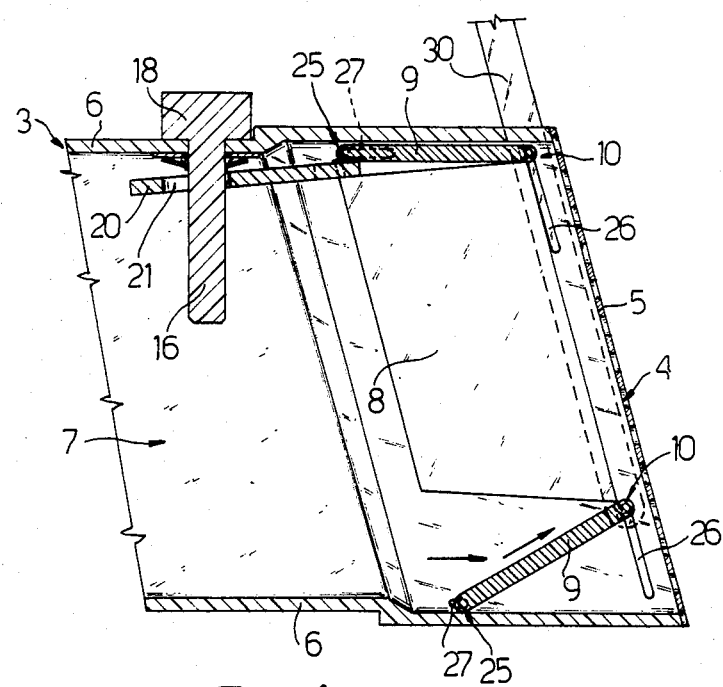
FIG. 4 shows a different operating configuration of the FIG. 3 inlet according to the present invention.

Number 1 in FIGS. 1 to 3 indicates an air inlet for a dash-panel 2 on a vehicle (not shown for simplicity), the said inlet comprising a body 3 designed to fit inside a compartment on the dash-panel and having a supply opening 4 for supplying air inside the passenger compartment on the said vehicle, the said opening having an ornamental screen 5 mounted flush with dash-panel 2. The said body 3 presents a number of side walls 6 arranged facing in pairs, in such a manner as to define an air supply duct 7, and essentially perpendicular to screen 5; the said body 3 housing, along duct 7 and immediately upstream from screen 5, a number of known deflecting vanes 8, arranged side by side, and a pair of deflecting surfaces 9 arranged facing each other, perpendicular to vanes 8 and supporting the latter hinged onto respective front edges 10 essentially coplanar with opening 4 and adjacent to screen 5. The said vanes 8 are designed to divert, in known manner, a stream of air flowing through opening 4 along a first given path (indicated by the arrows in FIG. 2), the direction of the said path depending on the position of vanes 8 in relation to walls 6, but, nevertheless, lying in a plane pependicular to that of vanes 8. According to the present invention, surfaces 9 are designed to divert the said air stream along a second given path (indicated by the arrows in FIGS. 3 and 4), the direction of the said path depending on the position of surfaces 9, but, nevertheless, lying in a second plane perpendicular to that of the said first path and to that of the said deflecting surface 9.

Vanes 8 are secured perpendicular to edges 10 by means of respective pins 12 housed in idle manner, according to the present invention, in respective through slots 13 formed on surfaces 9 and perpendicular to edges 10. The respective rear edges 14 of vanes 8 are hinged onto a control bar 15 housed inside duct 7 and parallel with the said second plane, the said bar 15 being designed to move longitudinally subsequent to manual operation, either direct or via an appropriate known transmission (not shown for simplicity), of a slide 16 supported in sliding manner on body 3 and operated by the user by means of a push-button 18 visible on dash-panel 2 and connected to slide 16 either directly, as in the example shown, or via the said transmission. Slide 16 is preferably offset in relation to bar 15 and connected to the latter by means of a projecting arm 20 extending perpendicular to the longitudinal axis of bar 15 and having a longitudinal slot 21 engaged by slide 16. In like manner, edge 10, vanes 8 and bar 15 define a number of articulated, rigidly-connected quadrilaterals controllable by slide 16 (by virtue of slot 21) even if bar 15 is not perfectly parallel with walls 6, subsequent to displacement of surfaces 9. Operation of slide 16 therefore causes all the vanes 8 to turn simultaneously and by the same amount about the axes of pins 12, the direction of rotation depending on the operating direction of slide 16, in such a manner as to change the angle of vanes 8 in relation to walls 6 and, consequently, also the direction of the said first path and the supply direction of the said air stream through opening 4 in a plane perpendicular to vanes 8.

According to the present invention, the direction of the said air stream in the plane perpendicular to the foregoing plane is changed by displacing deflecting surfaces 9 and, with them, the entire assembly consisting of vanes 8 and their respective control means, which is fitted integral with deflecting surfaces 9. Despite the latter being adjacent to screen 5, such displacement is achieved by virtue of edges 10 and respective rear edges 25 of surfaces 9 being hinged to respective guides 26 and 27 supported on walls 6 and along which edges 10 and 25 may be slid by manually operating, either directly or via an appropriate known transmission (not shown for simplicity), a rod 30 fitted in sliding manner onto body 3 and controllable by a push-button, of the same type as 18, visibly located on dash-panel 2 and not shown for reasons of simplicity. In more detail, edges 10 are hinged to respective pairs of straight guides 26 preferably consisting of through slots formed in body 3 and both adjacent to and parallel with screen 5. Edges 25, on the other hand, are hinged to respective pairs of straight guides 27 adjacent to and parallel with an opposite pair of walls 6 and essentially perpendicular to screen 5 and to respective front guides 26 with which the said guides 27 are coplanar by virtue of being formed on the same walls 6. One of guides 27, also preferably consisting of slots, is preferably short, more or less of the same length as slots 13, whereas the other is relatively much longer, more or less of the same length as guides 26, depending on how much sweep is required of deflecting surfaces 9. Operation of rod 30, which is rigidly connected to at least one of deflecting surfaces 9, on respective edge 10, causes edges 10 to slide simultaneously and by the same amount inside guides 26, e.g. from the position shown in FIG. 3 to that of FIG. 4. By virtue of edges 25 being secured inside guides 27 arranged crosswise in relation to guides 26, such displacement causes deflecting surfaces 9 to turn in opposite directions and at rightangles in relation to vanes 8, so as to cause the entire articulated assembly consisting of deflecting surfaces 9 and vanes 8 on the same to move perpendicular to the operating plane of vanes 8, when rod 30 is shifted between the two limit positions shown in FIGS. 3 and 4.

The advantages of the inlet according to the present invention will be clear from the foregoing description. Its relatively simple structure provides for both low-cost production and troublefree assembly. Furthermore, it enables the direction of the air supply from the supply opening to be regulated in two perpendicular planes, as on known types of inlets with swivel bodies, despite the said opening being closed off by a screen flush with the dash-panel, thus enabling the production of air inlets of superior appearance, as compared with known types, but with no impairment in terms of air supply adjustment. To those skilled in the art it will be clear that changes may be made to the arrangement described and illustrated herein without, however, departing from the scope of the present invention.

I claim:

1. An air inlet for a vehicle dash panel comprising:
   an air duct having a substantially rectangular cross section defined by a first pair of spaced parallel side walls and a second pair of spaced parallel top and bottom walls whose ends are integral with the top and bottom respectively of said first pair of spaced parallel side walls;
   a plurality of movable vertical vanes arranged side by side for diverting air flow in a horizontal direction, said vertical vanes being rotatable about their vertical axis fixed with respect to said second pair of spaced parallel top and bottom walls;
   a first means for simultaneously moving said vertical vanes in a horizontal direction, said first means for moving being manually accessible from the exterior of said air duct on the front face of said dash panel;
   a pair of movable horizontal vanes one each located near each wall of said second pair of spaced parallel top and bottom walls respectively, said horizontal vanes being rotatable about their horizontal axis fixed with respect to said first pair of spaced parallel side walls;
   a second means for simultaneously moving said pair of horizontal vanes in a vertical direction, said second means for moving being manually accessible from the exterior of said air duct on the front face of said dash panel; and
   a screen for covering said air duct and both said vertical and horizontal vanes which does not impede access to both of said first and second means for moving while allowing air to flow through said air duct and into the vehicle interior.

2. The device of claim 1, wherein said pair of movable horizontal vanes further comprises first and second hinge means proximate said vane's front and rear edges respectively, said first and second hinge means of each of said horizontal vanes being connected to first and second straight guide members respectively, said first and second straight guide members being capable of cooperating with said second means for moving to enable air to be directed in a vertical direction.

* * * * *